United States Patent [19]

Bellah et al.

[11] Patent Number: 4,494,418
[45] Date of Patent: Jan. 22, 1985

[54] MULTI-DIRECTIONAL SINGLE LEVER CONTROL FOR TRANSMISSIONS

[75] Inventors: Glen R. Bellah, Bolingbrook; Richard H. Mylander, Glen Ellyn; Lloyd B. Idelman, Evanston; Robert R. Coons, Hinsdale, all of Ill.

[73] Assignee: International Harvester Co., Chicago, Ill.

[21] Appl. No.: 379,409

[22] Filed: May 18, 1982

[51] Int. Cl.³ .................. B60K 20/00; B60K 20/10
[52] U.S. Cl. .................. 74/475; 74/473 R; 74/335
[58] Field of Search .................. 74/473 R, 475, 335

[56] References Cited

U.S. PATENT DOCUMENTS

| Re. 29,414 | 9/1977 | Prokop | 74/473 R |
|---|---|---|---|
| 2,052,042 | 8/1936 | Thompson | 74/473 |
| 2,181,627 | 11/1939 | Peterson | 74/475 |
| 2,435,930 | 2/1948 | Schjolin | 180/54 |
| 2,772,652 | 12/1956 | Du Shane et al. | 74/337.5 |
| 2,917,941 | 12/1959 | Wittren | 74/473 |
| 3,192,793 | 7/1965 | Hurst | 74/476 |
| 3,511,105 | 5/1970 | Matter | 74/473 R |
| 3,570,636 | 3/1971 | Franz et al. | 192/3.5 |
| 3,572,152 | 3/1971 | Bruhn et al. | 74/476 |
| 3,597,991 | 8/1971 | McCormick | 74/476 |
| 3,616,709 | 11/1971 | Malm | 74/473 R |
| 3,906,813 | 9/1975 | Webber et al. | 74/473 R |
| 4,022,078 | 5/1977 | Malott | 74/475 |
| 4,128,151 | 12/1978 | Grosseau | 192/4 A |
| 4,275,612 | 6/1981 | Silvester | 74/473 R |
| 4,285,250 | 8/1981 | Iizuka et al. | 74/473 P |
| 4,337,673 | 7/1982 | Kawamoto | 74/475 |
| 4,370,897 | 2/1983 | Carlo | 74/475 |

FOREIGN PATENT DOCUMENTS 417462 11/1910 France .................. 74/475

Primary Examiner—Leslie A. Braun
Assistant Examiner—Michael J. Gonet
Attorney, Agent, or Firm—Boris Parad; F. David Au Buchon

[57] ABSTRACT

A multi-directional single lever control for a transmission with at least two modes of operation comprises two juxtaposed sets of speeds correlating to these modes. The shift lever pivoting with a lever mount in one direction engages speeds working in one mode and pivoting about the lever mount selectively engages oppositely aligned speeds in either mode of operation. A switch actuated by the shift lever rotation about the mount lever controls, a valve assembly for rerouting fluid flow into passages corresponding to a selected mode of operation.

9 Claims, 5 Drawing Figures

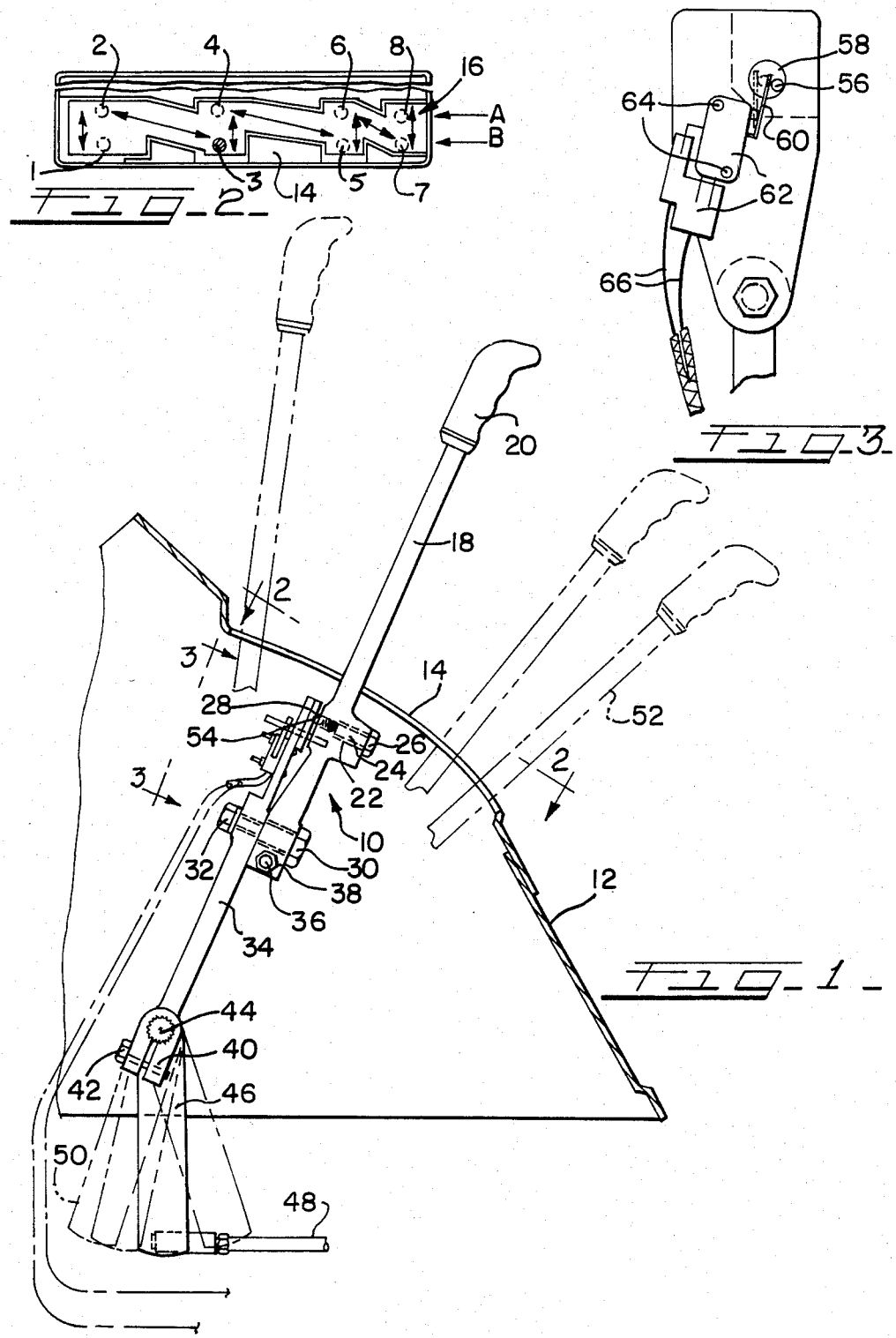

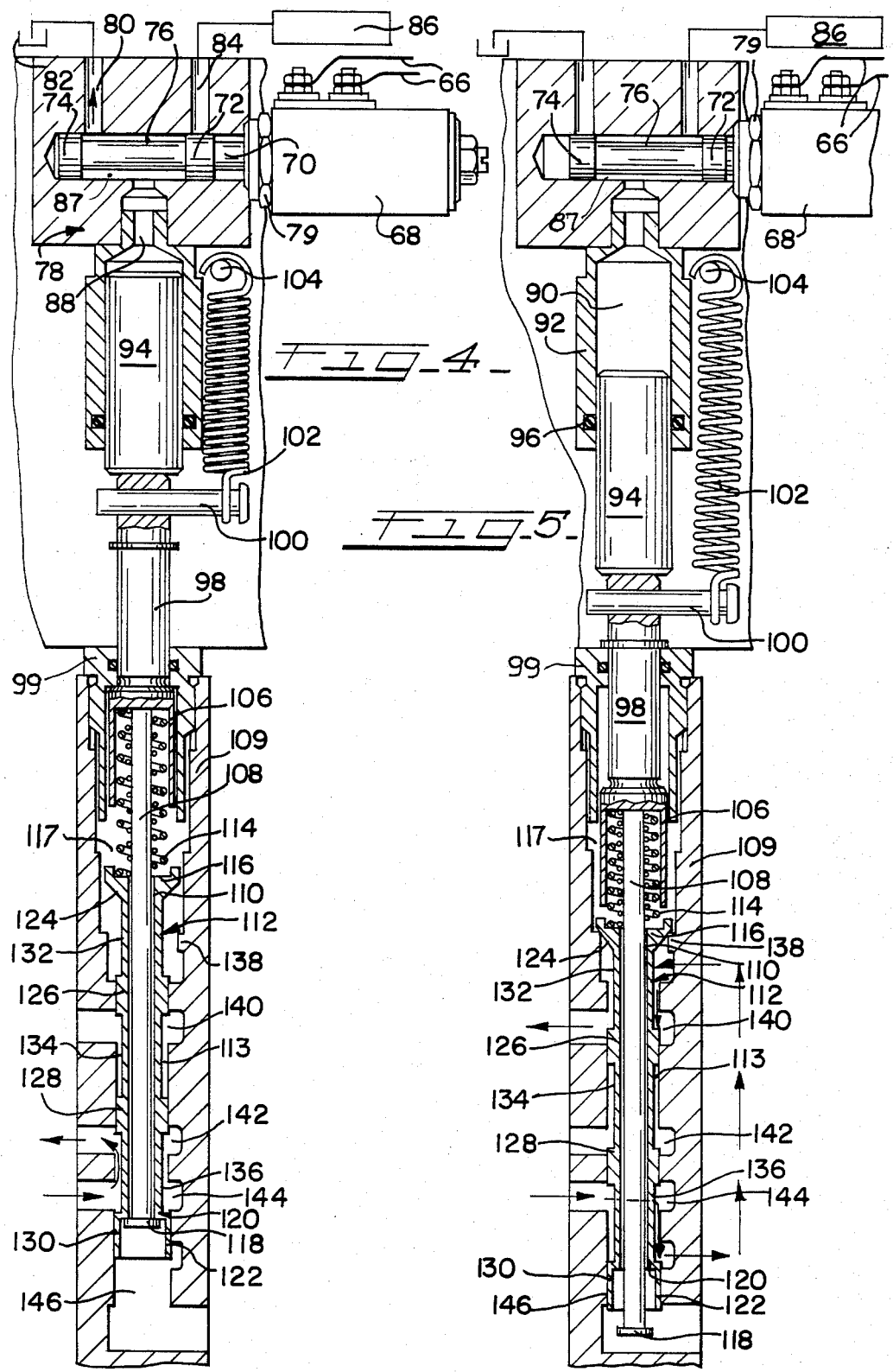

MULTI-DIRECTIONAL SINGLE LEVER CONTROL FOR TRANSMISSIONS

BACKGROUND OF THE INVENTION

1. Field of the Invention:

This invention pertains to transmission controls and more particularly to a single lever control of the motor vehicle transmission.

2. Description of the Prior Art:

The prior art is replete with various examples of transmission controls for motor vehicles. For instance, the U.S. Pat. No. 2,435,930, issued to H. 0. Schjolin, discloses an angle drive mechanism coupling power plant and vehicle axle which employs a gear lever and mount therefor where the mounting of the lever permits a small lateral motion of the mount.

Another U.S. Pat. No. 2,917,941, issued to R. A. Wittren, discloses a selector means utilizing a single selector lever or equivalent member which is movable through a shift pattern having a plurality of parallel slots and an intersecting crossover slot.

Still another U.S. Pat. No. 4,285,250, issued to Iizuka, discloses a control lever for a transmission of a vehicle.

However, none of the prior art references of record describes, illustrates or teaches a novel single lever control as disclosed in the subject invention.

SUMMARY OF THE INVENTION

The present invention provides for a multidirectional single lever control for a transmission with at least two modes of operation. This control comprises a speed selector panel with a shift pattern incorporated therein. A shift lever is freely moveable within and in conformance with this pattern. The shift pattern comprises first and second sets of speeds representing each of these modes of operations which are disposed opposite to each other. The shift lever is connected with a lever mount mechanically linked with the transmission and engaging the first set of speeds therein. The shift lever is able to move relative to the lever mount for carrying out a shift between the modes of operation. Switch means secured to the lever mount are actuated by the shift lever movement laterally between the modes.

The switch means are attached to a valve mechanism for controlling an input of pressurized fluid flow thereinto and actuation thereof. The valve mechanism facilitates hydraulic actuation of either of these modes of operation in response to the pressurized fluid flow input.

BRIEF DESCRIPTION OF THE DRAWINGS

FIG. 1 is an illustrative side view of a shift lever control mechanism;

FIG. 2 is an enlarged fragmentary view of the control mechanism taken substantially along the lines 2—2 of FIG. 1;

FIG. 3 is an enlarged fragmentary view of the control mechanism taken substantially along the lines 3—3 of FIG. 1;

FIG. 4, is a schematic illustration and partially cross-sectional view of the control mechanism in the TA mode of transmission operation;

FIG. 5 is a schematic illustration and partially cross-control mechanism in the DD mode of transmission operation.

DESCRIPTION OF THE PREFERRED EMBODIMENT

The invention may be carried into practice in a number of ways but one specific embodiment will be described by way of example only.

A motor vehicle transmission comprises two sections called, by way of an example, direct drive (DD) and torque amplifying (TA) auxiliary transmission. TA gives a slower speed in each of the standard speeds. The first mode of operation representing DD transmission engagement includes a set of four speeds. The second mode of operation, wherein the TA transmission is engaged, provides another set of four speeds. So in toto the vehicle has eight speeds. Conventional designs of transmission controls usually have two levers, one for each transmission. The present invention combines control for both DD and TA transmission by virtue of a single shift lever which is able to move in different directions.

Referring now to the drawings wherein reference characters designate like or corresponding parts throughout the several views, there is shown in FIG. 1 a multidirectional control mechanism 10. The transmission control 10 can be utilized in various motor vehicles, such as agricultural tractors or the like. The control mechanism 10 is partially encompassed by a control enclosure 12 located within an easy reach of a vehicle operator. A shift selector panel 14, which has a built-in pattern 16 of a speed selection, as best shown in FIG. 2, is incorporated in the enclosure 12. The first set of speeds 2-4-6-8, as indicated by the arrow "A" in FIG. 2, represents the first or DD mode of operation of the vehicle transmission. The second set of speeds 1-3-5-7 indicated by the arrow "B" in FIG. 2 is disposed opposite to the first of speeds. The second set of speeds represents TA or second mode of operation of the vehicle transmission. A shift lever 18 is freely moveable within the shift pattern 16. The lever 18 has a handle 20. The shift lever 18 includes a cavity 22 which houses a compression spring 24. The compression spring 24 abuts a plug bolt 26 at one end and is attached to a detent ball 28 at another. A pivot bolt 30 projecting through the shift lever 18 is secured by a locking nut 32 to a lever mount 34. Thus, the lever 18 is supported by and moveable relative to the lever mount 34. A locking bolt 36 ties together straddled legs 38 of the shift lever 18. The straddled legs 40 of the lever mount 34 are tied by a locking bolt 42, thereby securing the lever mount 34 to a shaft 44. An arm 46 mounted on the shaft 44 is pivotally connected to a link 48 which is operatively connected with a DD transmission. The phantom positions 50 of the pivoting arm 46 represent the change of the DD speeds from 2 to 8. The phantom positions 52 of the shift lever 18 represent four locations thereof within the shift selector panel 14.

The lever mount 34 includes a pair of sockets 54 adapted to receive and hold the detent ball 28 in either DD or TA positions of the shift lever 18. As illustrated in FIG. 3, the shift lever 18 has a pin 56 projecting through an aperture 58 in the lever mount 34. A prong 60 of a microswitch 62 which is attached by screws 64 to the lever mount 34, contacts the pin 56 and actuated thereby. The microswitch 62 is connected by wires or cables 66 to a solenoid 68.

As best shown in FIG. 4, the solenoid 68 comprises a spool 70 having lands 72 and 74 with a groove 76 therebetween. The solenoid 68 is attached to a valve body 78 by any mechanical means such as a threaded sleeve 79. The valve 78 comprises a dump line 80 connected with an oil reservoir 82 and input passage 84 connected with a fluid pressure circuit 86. The valve 78 also includes a spool bore 87 for reciprocable movement of the spool 70 therein. The spool bore 87 is communicating with a channel 88 which in turn communicates with a cylindrical bore 90 in a casing 92. A cylinder 94 is reciprocably moveable within the bore 90 compressing hydraulic fluid contained therein. The casing 92 has an O-ring seal 96. The cylinder 94 contacts and intimately engages a piston 98. A pull pin 100 projects through the piston 98. A pull-back spring 102 hooked to the pin 100 at one end and to a projecting lug 104 secured to the valve body 78 at another.

The piston 98 has a cup-shaped lower portion 106 with a rod guide 108. A control valve 109 attached to the valve 78 includes a piston 98 moveable through a valve collet 99 and a spool bore 110 in the spool 112. The spool 112 is moveable in the control valve bore 113. A compression spring 114 is disposed between the dish-shaped platform 116 of the spool 112 and the piston lower portion 106. The piston lower portion 106 is displaceable within the piston bore 117. The rod 108 is capped by a flange 118 at its lower end. The flange 118 abuts a shoulder 120 in a cylinder shaped cavity 122 of the spool 112. The platform 116 has a conical or tapered portion 124. The spool 112 comprises lands 126, 128, and 130 with grooves 132, 134, and 136. The valve body 109 includes a collar 138 projecting into the piston bore 117.

The control valve body 109 comprises a direct drive (DD) passage 140 and torque amplifying (TA) passage 142 being alternatively filled with the hydraulic fluid from the oil supply passage 144. The rod 108 is extendible into a chamber 146 in the valve body 109.

In operation, the shift lever 18 displacement along the line of speeds 2-4-6-8 working in the DD mode of operation will engage one of them in compliance with the pattern 16, as shown in FIG. 2. The shift lever positions 52 correspond to the pivot arm 46 phantom positions 50. The shift lever 18 rotates the shaft 44, via the lever mount 34, turning the pivot arm 46. The pivot arm 46 in its turn moves the link 48 operably connected with and engaging the DD transmission.

Whenever it is necessary to operate a tractor in a TA mode, an operator shifts the lever 18 essentially transversely to the line of DD speed positions. This movement will switch to and engage the TA transmission from any speed in the DD set of speeds. For instance, a lateral move from a DD speed 4 will shift it to a TA speed 3, and so forth. This lateral move of the shift lever 18 translates into a limited rotation thereof about a pivot bolt 30. The detent ball 28 forced by the spring 24 into the socket 54 provides the exact positioning of the shift lever 18 in both DD or TA positions. The ball 28 also provides a definite feel in each of these positions and also prevents the shift lever 18 from shifting back and forth without an affirmative operator effort. As a result of the lateral shifting the shift lever pin 56 pushes a microswitch prong 60. Thus, switch 62 energizes and de-energizes the solenoid valve 68 wired therewith, which controls the pressurized fluid flow input for hydrauic actuation of said TA or DD transmissions.

As shown in FIG. 4, the hydraulic oil flow from the pressure circuit 86 through the input passage 84 is blocked by the spool land 72. Hence, the flow of the hydraulic fluid through the channel 88 is blocked. There is no pressure applied to the cylinder 94 and therefore the spring 102 pulls the piston 98 and the cylinder 94 to their uppermost position. In this position the flange 118 of the rod guide 108 abutting the shoulder 120 brings the spool 112 to its uppermost position. The hydraulic fluid from the supply passage 144, connected with a tractor hydraulic system, can be admitted in the torque amplifying passage 142 through a control valve bore 113. At this time the flow of the hydraulic fluid through the direct drive passage 140 is blocked by the lands 128 and 126. Consequently, the TA transmission is engaged.

As illustrated in FIG. 5, when the solenoid 68 is energized, the land 72 is brought closer to the solenoid body 68. The passage 84 is now open to the hydraulic fluid entry into the bore 90. Simultaneously the land 74 blocks the access of fluid to the dump line 80 leading to the reservoir 82. The pressure of the admitted fluid forces the cylinder 94 to move downwardly stretching the spring 102 and pushing the piston 98 downwardly. The piston 98 compresses the spring 114 against the platform 116, thereby forcing the spool 112 to move downwardly until the conical portion 124 thereof contacts the collar 138. In this position the fluid flow from the supply passage 144 to the TA passage 142 is blocked by the land 128 and the fluid will be forced to go through the bypass passage (not shown) into the direct drive passage 140, as indicated by arrows in FIG. 5. Thus, the DD transmission is engaged.

When the solenoid is de-energized, the cylinder 94 urged by the spring force 102 moves upwardly forcing the fluid in the casing 92 to mcve into the reservoir 82 through the dump line 80.

The field operations require various speeds and drawbar loads correlated to the varying terrain and load conditions. An operator uses DD gears 2-4-6-8 to start with. Then when a slower speed or more drawbar pull is needed, he or she simply moves the shift lever 18 in a lateral movement to the TA set of slower speeds 1-3-5-7. Again, with the increased drawbar pull or slower speed is no longer needed, a short lateral movement of the shift lever 18 would bring the tractor back to its DD original speed. With very little effort required and with this shifting action right at the operator's finger tips, the operator now has much better and easier control of the tractor operation, thus reducing fatigue. As a result of easier shifting more attention would be brought to an operation of the tractor and implements outside the tractor cab.

As is evident from the above, one shift lever for all speed transmission operations increases operator's efficiency since it eliminates two lever manipulation. The electric solenoid in combination with a piston-cylinder assembly controlling the hydraulic switch between TA and DD transmission operations eliminate conventional mechanical linkage performing the same function. Deletion of the mechanical linkage not only alleviates shifting efforts and permits the shift lever to be placed more conveniently at operator locations, but it also helps to better seal the operator's cab. This leads to a less noise and dust penetration into the cab. Furthermore, there is no need to clutch for shifting between TA and DD engagements as is done in some of the existing tractors.

The foregoing description and drawings merely illustrate the preferred embodiment and the invention is not limited thereto, except insofar as the appended claims are so limited, and those skilled in the art who have the disclosure before them will be able to make modifications and variations without departing from the scope of the invention.

What is claimed is:

1. A multi-directional single lever control for a transmission with at least two modes of operation, said control comprising:
   a speed selector panel with a shift pattern incorporated therein;
   a shift lever freely moveable within and in conformance with said pattern;
   said shift pattern comprising first and second sets of sequentially aligned speeds;
   said sets opposing each other and respectively operating in one of said modes;
   said shift lever connected with a lever mount being mechanically linked with said transmission and engaging said first set of speeds therein;
   said shift lever pivotally mounted to said lever mount to provide an oscillatory motion for immediate and alternate engaging of speeds in said opposed sets and pivoting together with said lever mount for engaging said first set of speeds;
   switch means secured to said lever mount and actuated by said shift lever when said shift lever pivots about said lever mount;
   said switch means attached to a valve means for controlling an input of pressurized fluid flow thereinto and actuation thereof;
   said valve means hydraulically engaging either of said modes of operation in response to said pressurized fluid flow input.

2. The invention according to claim 1, and
   said switch means comprising a valve for opening and closing a pressurized fluid access into said valve means for controlling a spool assembly alternately directing fluid flow into passages corresponding to said modes of operation.

3. The invention according to claim 1, and
   said lever mount having a plurality of sockets with positions thereof being correlated to said modes of operation; and
   said shift lever comprising a detent ball urged by a shift lever spring to move into one of said sockets thereby giving an operator a palpable feel of each shift lever position and preventing an accidental shifting of said shift lever without a positive operator effort.

4. The invention according to claim 1, and
   said lever mount having an aperture; and
   said shift lever including a pin projecting through said aperture and intimately engageable with and actuating said switch means.

5. The invention according to claim 1, and
   said switch means comprising an electrical switch affixed to said lever mount;
   a solenoid valve being electrically connected with and energized by said switch; and
   said solenoid valve controlling entry of pressurized fluid into said valve means.

6. The invention according to claim 1, and said valve means comprising a reciprocably moveable cylinder abuttingly engageable and moveable with a spool assembly being urged by a pull-back spring to move toward said cylinder;
   said cylinder displaceable in one direction by pressurized fluid flow admitted into said valve means and moveable in opposite direction by force of said pull-back spring when said pressurized fluid flow is blocked by said switch means; and
   said spool assembly distributing pressurized hydraulic fluid flow for engagement of said transmission in said modes of operation by blocking and opening pertinent passages in said valve means in response to pressure applied to said cylinder through said switch means.

7. In a motor vehicle with a transmission having at least two modes of operation providing at least two sets of speeds, a multi-directional single lever control comprising:
   a shift lever freely moveable within a speed selector panel in conformance with a shift pattern incorporated in said panel;
   said shift pattern including one set of successive speeds correlating to first mode of transmission operation disposed along one side thereof and another set of successive speeds providing second mode of operation juxtaposed ralative thereto;
   said shift lever pivotally mounted on a lever mount in an oscillatory manner and being mechanically linked with said transmission for an immediate engagement of oppositely aligned speeds in said sets;
   said shift lever pivoting together with said lever mount in said first mode of operation for engaging said one set of speeds;
   electrical switch means affixed to said lever mount and actuated by said shift lever pivotal movement thereabout;
   said electrical switch means controlling an admission of pressurized fluid into a valve assembly for triggering alternate hydraulic actuation of said modes of operation by rerouting hydraulic fluid into respective lines.

8. The invention according to claim 7, and
   said shift lever comprising a spring loaded detent ball lockingly engageable with said lever mount to prevent an accidental shifting of said shift lever from fixed positions corresponding to said modes;
   said switch means energizing a valve for controlling fluid admission into said valve assembly.

9. The invention according to claim 7, and
   said valve assembly comprising a cylinder contacting a spool mechanism and moveable therewith; and
   said spool mechanism including a pull-back spring urging said mechanism and said cylinder to move in a direction opposite to that of said pressurized fluid flow controlled by said switch means.

* * * * *